(12) United States Patent
Mehta et al.

(10) Patent No.: US 11,537,982 B1
(45) Date of Patent: Dec. 27, 2022

(54) INVENTORY SORTING AND TRANSPORT

(71) Applicant: Amazon Technologies, Inc., Seattle, WA (US)

(72) Inventors: Vatsal Mehta, Renton, WA (US); Chad Clifford Horton, Bonney Lake, WA (US); Maxim P. Hoffman, Bothell, WA (US); Max Alfonso Bruccoleri, Seattle, WA (US); Benjamin Frederick Luster, Gig Harbor, WA (US); Dmytro V. Pogrebnoy, Auburn, WA (US); Stephen Malcolm Elliott, Steilacoom, WA (US); Larry Joe Robb, Miramar Beach, FL (US)

(73) Assignee: Amazon Technologies, Inc., Seattle, WA (US)

( * ) Notice: Subject to any disclaimer, the term of this patent is extended or adjusted under 35 U.S.C. 154(b) by 38 days.

(21) Appl. No.: 16/688,780

(22) Filed: Nov. 19, 2019

Related U.S. Application Data

(60) Provisional application No. 62/914,299, filed on Oct. 11, 2019.

(51) Int. Cl.
    *G06Q 10/08* (2012.01)
    *B65G 1/137* (2006.01)

(52) U.S. Cl.
    CPC ......... *G06Q 10/087* (2013.01); *B65G 1/1373* (2013.01)

(58) Field of Classification Search
    CPC .............................. G06Q 10/087; B65G 1/1373
    USPC .......................................................... 705/28
    See application file for complete search history.

(56) References Cited

U.S. PATENT DOCUMENTS

| | | | |
|---|---|---|---|
| 4,827,423 A * | 5/1989 | Beasley | G01N 29/2493 700/100 |
| 5,423,431 A | 6/1995 | Westin | |
| 5,460,271 A | 10/1995 | Kenny et al. | |
| 5,638,938 A | 6/1997 | Lazzarotti et al. | |
| 5,788,053 A | 8/1998 | Glawitsch | |
| 5,950,800 A | 9/1999 | Terrell et al. | |
| 6,259,967 B1 | 7/2001 | Hartlepp et al. | |
| 6,609,607 B2 * | 8/2003 | Woltjer | B65G 37/02 198/457.03 |
| 7,012,210 B2 | 3/2006 | Kibbler et al. | |
| 8,280,547 B2 | 10/2012 | D'Andrea et al. | |
| 9,087,314 B2 | 7/2015 | Hoffman et al. | |
| 9,580,245 B2 | 2/2017 | Mansfield et al. | |
| 9,630,784 B2 | 4/2017 | Ragan | |

(Continued)

FOREIGN PATENT DOCUMENTS

WO    WO-2004069699 A2 *  8/2004 ........... G05D 1/0278

OTHER PUBLICATIONS

U.S. Appl. No. 16/712,848, "Consolidation and Transportation of Items," filed Dec. 12, 2019.

(Continued)

*Primary Examiner* — Luna Champagne
(74) *Attorney, Agent, or Firm* — Kilpatrick Townsend & Stockton LLP

(57) ABSTRACT

A system for sorting and transporting inventory items from a warehouse environment to a packing station. A sorting device receives the inventory item and transports the item to a sort location. The item is transferred to an inventory transport and transported to a packing station for further processing.

5 Claims, 6 Drawing Sheets

(56) References Cited

U.S. PATENT DOCUMENTS

| | | |
|---|---|---|
| 10,278,095 B1 | 4/2019 | Kothari et al. |
| 10,315,859 B1 | 6/2019 | Zhao et al. |
| 10,633,186 B2 * | 4/2020 | Valinsky .............. B65G 1/0492 |
| 2013/0248324 A1 * | 9/2013 | Berdelle-Hilge ...... B65H 29/26 198/375 |
| 2017/0101268 A1 * | 4/2017 | Berdelle-Hilge ...... B65G 39/20 |
| 2017/0362036 A1 | 12/2017 | Hartmann et al. |
| 2019/0300285 A1 * | 10/2019 | Cheng .................. B65G 1/1373 |
| 2020/0002094 A1 * | 1/2020 | Schedlbauer ........... G07F 17/12 |
| 2020/0265504 A1 * | 8/2020 | Kim ..................... G06Q 10/087 |

OTHER PUBLICATIONS

U.S. Appl. No. 16/712,866, "Multi-Asin Consolidation and Transportation System," filed Dec. 12, 2019.

* cited by examiner

INVENTORY SORTING AND TRANSPORT

CROSS-REFERENCE TO RELATED APPLICATIONS

This application claims priority to U.S. Provisional Patent Application No. 62/914,299, filed Oct. 11, 2019, titled "INVENTORY TRANSPORT".

BACKGROUND

Modern inventory systems, such as those in mail order warehouses, supply chain distribution centers, airport luggage systems, and custom-order manufacturing facilities, face significant challenges in responding to requests for inventory items. For requests that contain multiple inventory items, the items must be collected from a storage area, grouped together, and transferred to a packaging area for shipping. In some existing approaches, items are individually gathered from the storage area and placed in a staging area for grouping. As a result, the packaging and shipping of items may be delayed and valuable space may be occupied by the staging area. Additionally, manually gathering and grouping items may result in erroneous inclusion the incorrect item(s) in a package or item(s) being damaged while being grouped or transported.

BRIEF DESCRIPTION OF THE DRAWINGS

Various embodiments in accordance with the present disclosure will be described with reference to the drawings, in which.

DETAILED DESCRIPTION

Figure 1:
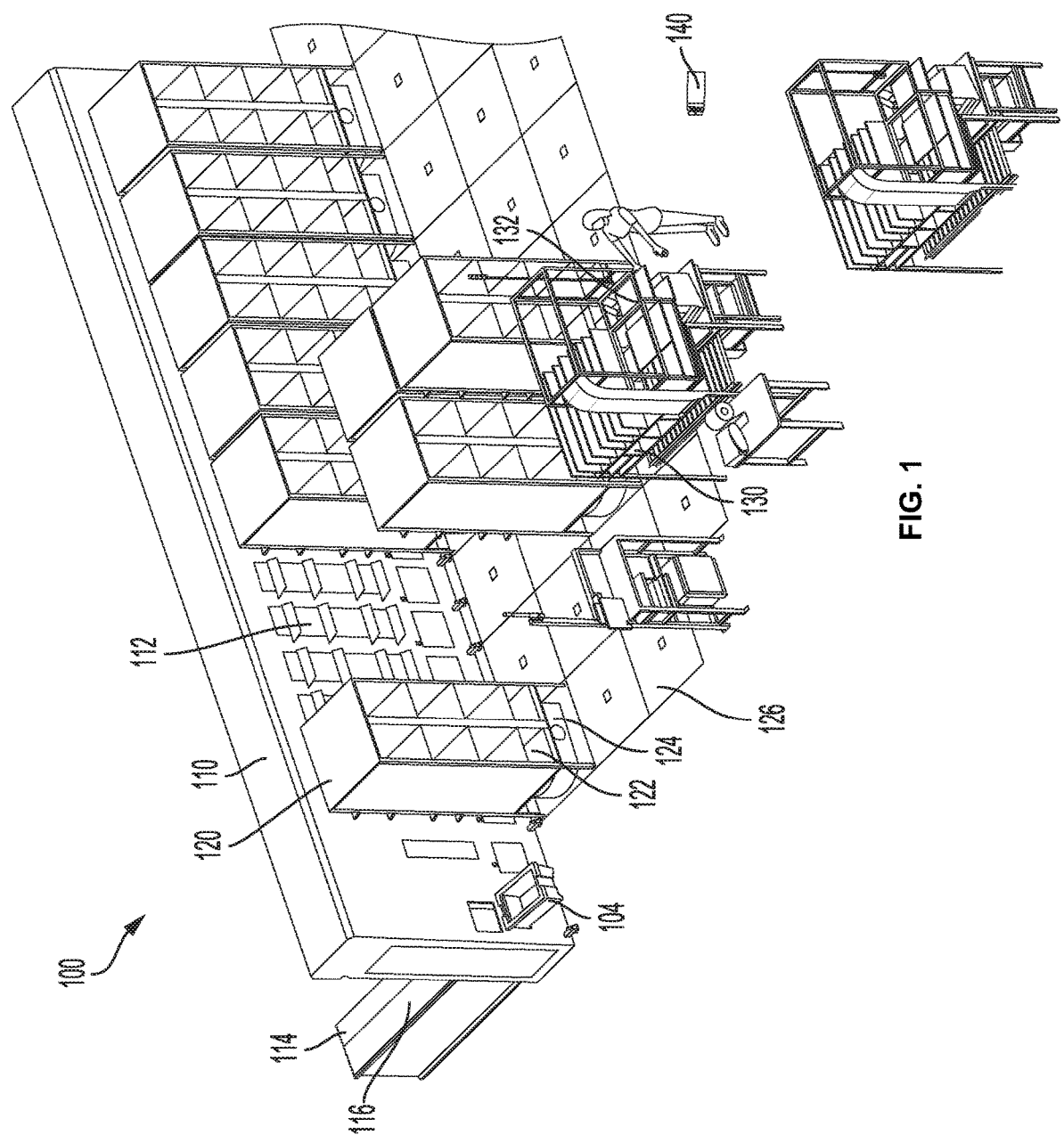
FIG. 1 illustrates an inventory system, in accordance with embodiments, for sorting, transporting, and packaging items.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments herein are directed to an inventory system for sorting and transporting inventory items. In various embodiments, the inventory system includes inventory transports for transporting inventory from a sorting device to a packing station. The sorting device can receive one or more inventory items from a warehouse environment and transport the items to one of many sort locations in the sorting device. In some embodiments, the sorting device transports the item to the sort location based on order data associated with an online order received from a purchaser. For example, the purchaser can place an online order for one or more items and the sorting device can transport the items associated with the order to a single sort location. The inventory transports can receive items from one or more sort locations and transport the items to a packing station. In various embodiments, the inventory transport are movable, and can be positioned adjacent to the sorting device to receive the items from multiple sort locations into multiple item slots on the inventory transport. The inventory transport can be repositioned, for example rotated, to receive additional items into additional item slots on the inventory transport from the same or different sort locations before the inventory transport moves to the packing station. The items in the multiple item slots of the inventory transport can be removed at the packing station for packing into shipping containers based on the order data associated with the purchaser. For example, one or more items ordered by a purchaser can be packaged together in a single shipping container.

As an illustrative example, an order can be received from an online purchaser. The order may contain multiple items, for example, bolts, makeup, and a battery. In response to the order being received, the purchased items can be located in a storage area, for example, a warehouse environment, and collected. Additional items not associated with the order may be collected before the items are transported to a sorting device. Additionally and/or alternatively, only some of the items associated with the order may be collected and transported to the sorting device with the remaining items collected and transported in a separate action. These items from a single order are fed into the sorting device and are grouped into a single sort location. For example, the bolts, makeup, and battery may be received by the sorting device at various times but will be transported to the same sort location for grouping. The items can be transported to the sort location based on the order data and/or on item data associated with the item. An inventory transport can be positioned to receive the items in an item location on the inventory transport. The inventory transport may receive the items as they arrive, or may be moved into position to receive the items at a later time. The inventory transport remains in position until all items associated with a single order are received or until all items associated with multiple orders are received. For example, the inventory transport may receive the bolts, makeup, and battery in a first item location and receive items associated with one or more additional orders in additional item locations. The inventory transport can transport the items from the sorting device to the packing station. The items can be transferred from the inventory transport to the packing station manually and/or using a device, for example, a robot or a robotic arm. The items associated with the order can be packed and removed from the inventory transport for further processing. The inventory transport can return to the sorting device to receive additional items. In some embodiments, the inventory transport can move to a staging position to wait for additional items and/or for replacement items needed to complete an order.

Referring now to the drawings in which similar identifiers refer to similar elements, FIG. 1 illustrates an inventory system 100 for sorting and transporting one or more items 102. In various embodiments, the inventory system 100 includes a sorting device 110, one or more inventory transports 120, and a processing station 130. The sorting device 110 can receive the items 102 and transport the items to one or more sort locations 112. The inventory transports 120 can be positioned adjacent to the sorting device 110 to receive the items 102 from the sort locations 112 into cubbies 122 on the inventory transports. The inventory transports 120 are movable to transport the items 102 from the sorting device 110 to the processing station 130. The items 102 can be transferred from the inventory transports 120 to the processing station 130 for packaging and/or further processing. In some embodiments, the inventory system 100 can include a management module 140 for assigning tasks to appropriate components of the inventory system.

The one or more items 102 can be goods or inventory purchasable by a purchaser, for example, an online purchaser. In various embodiments, the items 102 may be ordered by a purchaser through an online portal. For example, the purchaser may use the online portal to purchase bolts, makeup, and a battery. The items 102 can be retrieved from a warehouse environment and transported to the sorting device 110. In some embodiments, the items 102 are transported from the warehouse environment to the sorting device 110 with the inventory transports 120. However, any of the items 102 can be transferred to the sorting device 110 using any suitable transport method, for example, carts, drones, or robotic transports. The items 102 can be associated with order data received from a purchaser. For example, the order data can include the name or the address of the purchaser or the order date or delivery date requested by the purchaser. Additionally or alternatively the item can be associated with item data. The item data can include, for example, the size, weight, or priority status of the item.

In some embodiments, the items 102 are grouped in bins 104. The bins 104 can be used to hold the items 102 while the items 102 are being moved around the warehouse environment and/or while the items 102 are being moved to the sorting device 110. The items 102 can be removed from the bins 104 before being deposited into the sorting device 110. However, the items 102 can be removed from the bins 104 as a step of the sorting process.

The items 102 can be transported from the warehouse environment to the sorting device 110. In some embodiments, the sorting device 110 receive the items 102 on an input conveyor 114. The input conveyor can transport the items 102 from the warehouse environment to the sorting device 110.

In embodiments, the sorting device 110 is designed to receive the items and sort the items 102 by transporting the items to sort locations 112. The sort locations 112 can correspond to orders received from purchasers. For example, a single sort location 112 can be designated to receive all the items 102 that comprise an order. Alternatively, items 102 comprising an order may be deposited into multiple sort locations 112. The sort locations 112 can be openings sized and shaped for receiving one or more items 102. The sort locations 112 can include lateral partitions spaced apart from one another to define the opening.

The sort locations 112 can be arranged into columns and rows. The sort locations 112 can be arranged into uniform columns, each having the same number of rows. Alternatively, the columns may include varying number of rows. The width of the sort locations 112 can correspond to the width of item slots or cubbies 122 on the inventory transports 120. Similarly the height of the sort locations 112 can correspond to the height of the item slots or cubbies 122. Alternatively, the dimensions of the sort locations 112 may have dimensions that are different than the dimensions of some or all of the item slots or cubbies 122. In some embodiments, the number of sort locations 112 in a column can correspond to the number of cubbies 122 in an inventory transport. In various embodiments, the sort locations 112 can receive items 102 through a first open side and transfer the items to the inventory transport 120 through a second open side. The first and second open sides can be opposing sides.

In various embodiments, the structure of the sort location 112 with first and second open ends allows items 102 to be transferred one at a time to the inventory transport 120. For example, once an item 102 arrives at a sort location 112 in through the first open end, the item can be immediately transferred out the second open end to the inventory transport 120. However, in some embodiments, the sort locations 112 can be or include storage for temporarily storing items 102. For example, a designated sort location 112 can receive items 102 one at a time and hold the items until all the items comprising an order arrive at the designated sort locations. The items 102 can then be released to the inventory transport 120 together. In some embodiments, the sort locations 112 can be or include drawers, bins, or a restraint for restraining the items 102 in the sort locations 112.

In various embodiments, the items 102 can be moved to sort locations 112 based on order data associated with the items 102. For example, an order can be received from a purchaser. A first item 102 can be received by the sorting device 110. The sorting device 110 can transport the first item 102 to a sort location 112 associated with the order. The sorting device 110 can receive a second item 102 and transport the second item 102 to the sort location 112. The sorting device can transport items 102 that comprise an order to the sort location 112 until all items that comprise the order have been transported.

In some embodiments, the items 102 are transported to the sort locations 112 using transport sleds (known in the art, but not shown in the drawings). The transport sleds can receive information about an item and, through instructions in the management module 140, automatically transport the item from a receiving position to a sort location 112. The transport sleds can transport one or more items 102 at the same time. For example, the transport sleds can receive multiple items 102 from the receiving position. The transport sleds can transport the multiple items 102 to a single sort location 112. Alternatively, the transport sleds may transport the multiple items 102 to multiple sort locations 112.

The sorting device 110 can transfer the items 102 from the sort locations 112 to the inventory transports 120. As described previously, the items 102 can be transferred one at a time or multiple items 102 can be grouped together before the items 102 are transferred to the inventory transports 120. The inventory transports 120 can receive the items 102 in an opening defined by first and second opposing sidewalls. The sidewalls can be spaced apart from one another to allow one or more items 102 to be received by the inventory transports 120. In various embodiments, the inventory transports 120 include one or more cubbies 122 for receiving items 102. The cubbies 122 can be defined by the opposing sidewalls and one or more partitions spanning between the sidewalls and vertically spaced apart to define the slot.

In various embodiments, multiple cubbies 122 can be arranged in a pattern. In various embodiments, the cubbies 122 can be arranged in a pattern that corresponds to the pattern of sort locations 112 in the sorting device. However, in some embodiments, the cubbies 122 can be arranged in a pattern that differs from the pattern of sort locations 112. Each of the cubbies 122 can receive items 102 from a single order. However, items 102 from multiple orders may be received in a single item slot. Additionally or alternatively, items 102 from a single order can be deposited in multiple cubbies 122.

The inventory transports 120 can include a propulsion system 124 for moving the inventory transports between the sorting device 110 and the processing station 130. Additionally or alternatively, the propulsion system 124 can be used to move the inventory transports 120 around the warehouse environment or to designated area of the inventory system 100. For example, the propulsion system 124 may move the inventory transports 120 to a designated waiting area where items 102 can be added and/or removed from the cubbies 122. In some embodiments, the propulsion system can be or include a mobile drive unit.

In some embodiments, the inventory transports 120 can include a guidance system that can aid in moving the inventory transport around the warehouse environment. For example, the guidance system can generate a route for the inventory transport 120 to travel along. In various embodiments, the guidance system can receive data to instruct the propulsion system in moving the inventory transport 120 and/or generating a route. For example, the guidance system can receive data associated with an order and generate a route for the inventory transports 120 using the data. The data can be or include the priority of an order or the items associated with an order.

In further embodiments, the guidance system can include components for following a grid 126 in the warehouse environment. The grid 126 can include components to interact with the guidance system and aid in controlling the inventory transport 120. For example, the grid 126 can include markings and/or decals on the floor of the warehouse environment that can be read by components of the guidance system. The markings and/or decals can instruct the inventory transport 120 where to travel. The markings and/or decals may also provide data to the guidance system to aid in generating a route for the inventory transport 120 to follow.

The inventory transport 120 can transport the items 102 from the sorting device 110 to the processing station 130. The processing station 130 can receive the items 102 from inventory transports 120 for packing and/or further processing. For example, the items 102 can be packed into one or more packaging receptacles (e.g. a cardboard box, an envelope, or a bag). The items 102 can be transferred from the inventory transports 120 to the processing station 130 manually. However, the items may be transferred using a transfer device, for example, a robotic arm. The processing station 130 can receive the items 102 from the cubbies 122 onto a packing surface 132. Additionally or alternatively, the items 102 may be transferred to a conveyance assembly prior to arriving at the processing station 130.

In further embodiments, the processing station 130 can be or include a packaging station for removal of the items 102 from the cubbies 122. The processing station 130 can facilitate manual removal of the items 102 from the cubbies 122. However, the processing station 130 may be or include automated packaging components for automatic removal of the items 102 from the cubbies 122. For example, a robotic arm for manipulating the items 102. In many embodiments, the processing station 130 can be or include components used in fulfillment center environments, for example, automated packaging machines or manual pack walls.

The management module 140 assigns tasks to appropriate components of the inventory system 100 and coordinates operation of the various components in completing the tasks. These tasks may relate not only to the movement and processing of inventory items, but also to the management and maintenance of the components of the inventory system 100. For example, the management module 140 may assign a sort location 112 for items 102 based on data associated with an order, generate a route for the inventory transports 120 to follow, or provide packing instructions at the packing station. The management module 140 may select components of the inventory system 100 to perform these tasks and communicate appropriate commands and/or data to the selected components to facilitate completion of these operations. Although shown in FIG. 1 as a single, discrete component, management module 140 may represent multiple components and may represent or include portions of inventory transports 120 or other elements of inventory system 100. As a result, any or all of the interaction between an inventory transport 120 and the management module 140 that is described below may, in particular embodiments, represent peer-to-peer communication between that inventory transport 120 and one or more other inventory transports 120. The contents and operation of an example embodiment of management module 140 are discussed further below with respect to FIG. 2.

Figure 2:
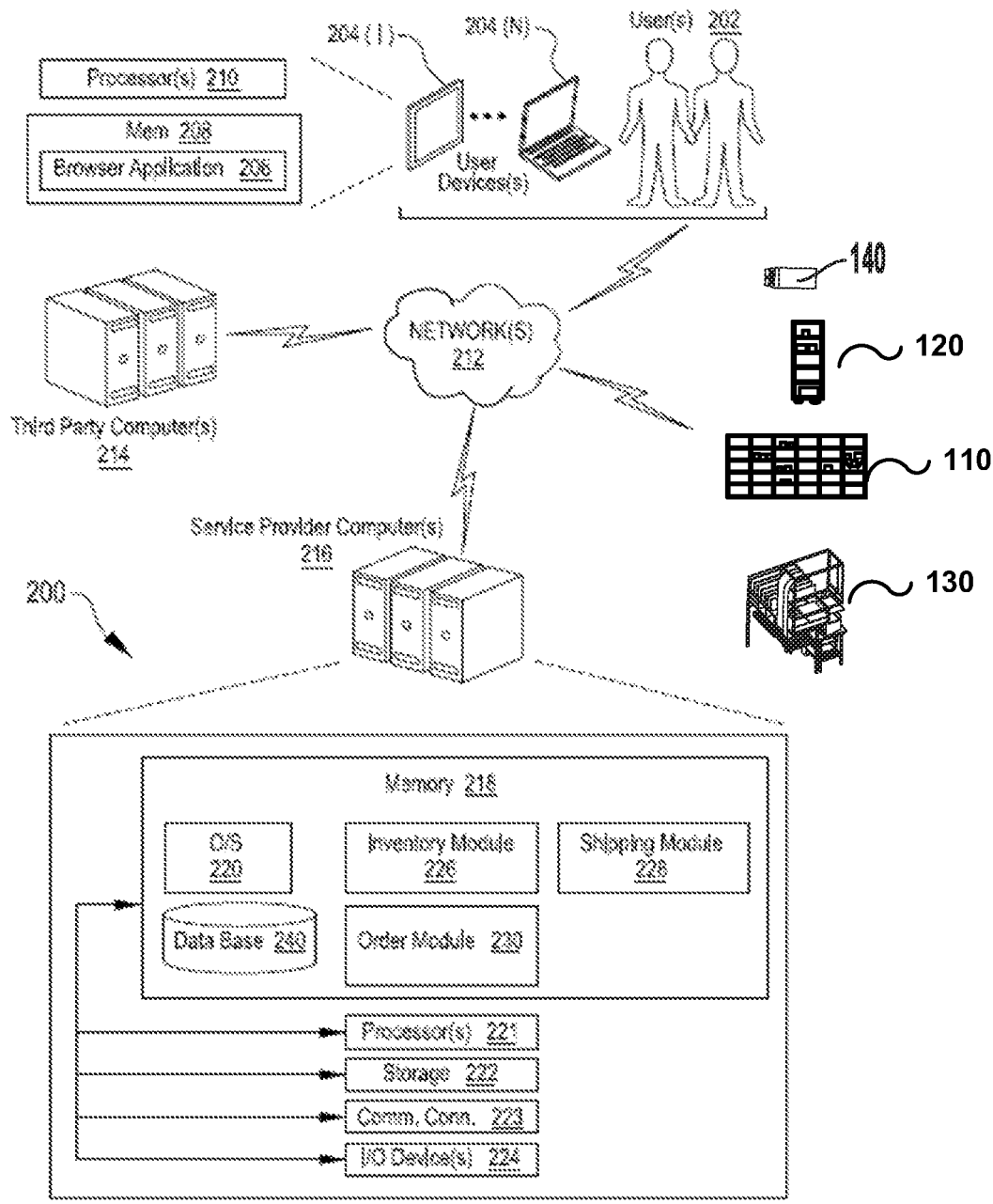
FIG. 2 is a schematic diagram depicting an illustrative system or architecture in which techniques related to the inventory system of FIG. 1 may be implemented in accordance with embodiments.

FIG. 2 depicts an illustrative system or architecture 200 in which techniques related to the management module 140 of the inventory system 100 of FIG. 1 may be implemented. In many embodiments, architecture 200 can represent management module 140. However, management module 140 may be a component of architecture 200. In architecture 200, one or more users 202 may utilize user computing devices 204(1)-(N) (collectively, user devices 204) to access a browser application 206 (e.g., a web browser) or a user interface (UI) accessible through the browser application 206, via one or more networks 212. The "browser application" 206 can be any browser control or native application that can access and display a network page or other information. In some aspects, the browser application 206 may be hosted, managed, and/or provided by a computing resources service or service provider, such as by utilizing one or more service provider computers 216. The one or more service provider computers 216 may, in some examples, provide computing resources such as, but not limited to, client entities, low latency data storage, durable data storage, data access, management, virtualization, hosted-computing-system-based software solutions, electronic content performance management, etc. The one or more service provider computers 216 may also be operable to provide web or network hosting, computer application development, and/or implementation platforms, combinations of the foregoing, or the like to the one or more users 202.

In one illustrative configuration, the user devices 204 may include at least one memory 208 and one or more processing units or processor(s) 210. The processor(s) 210 may be implemented as appropriate in hardware, computer-executable instructions, firmware, or combinations thereof. Computer-executable instruction or firmware implementations of the processor(s) 210 may include computer-executable or machine-executable instructions written in any suitable programming language to perform the various functions described. The user devices 204 may also include geo-location devices (e.g., GPS device or the like) for providing and/or recording geographic location information associated with the user devices 204.

The memory 208 may store program instructions that are loadable and executable on the processor(s) 210, as well as data generated during the execution of these programs. Depending on the configuration and type of user device 204, the memory 208 may be volatile (such as random access memory (RAM)) and/or non-volatile (such as read-only memory (ROM), flash memory, etc.). The user device 204 may also include additional removable storage and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 208 may include multiple different types of memory, such as static random access memory (SRAM), dynamic random access memory (DRAM), or ROM.

Turning to the components of the memory 208 in more detail, the memory 208 may include an operating system and one or more application programs or services for implementing the features disclosed herein via the browser application 206 or dedicated applications (e.g., smart phone applications, tablet applications, etc.). The browser application 206 may be configured to receive, store, and/or display a website, a link to an electronic marketplace, or other interface for interacting with the one or more service provider computers 216. Additionally, the memory 208 may store access credentials and/or other user information such as, but not limited to, user IDs, passwords, and/or other user information. In some examples, the user information may include information for authenticating an account such as, but not limited to, a device ID, a cookie, an IP address, a location, or the like. In addition, the user information may include a user 202 provided response to a security question or a geographic location obtained by the user device 204.

In some examples, the networks 212 may include any one or a combination of many different types of networks, such as cable networks, the Internet, wireless networks, cellular networks and other private and/or public networks. While the illustrated example represents the users 202 accessing the browser application 206 over the networks 212, the described techniques may equally apply in instances where the users 202 interact with the one or more service provider computers 216 via the one or more user devices 204 over a landline phone, via a kiosk, or in any other manner. It is also noted that the described techniques may apply in other client/server arrangements (e.g., set-top boxes, etc.), as well as in non-client/server arrangements (e.g., locally stored applications, etc.).

As described briefly above, the browser application 206 may allow the users 202 to interact with the one or more service provider computers 216, such as to access content like webpages or network pages. The one or more service provider computers 216, perhaps arranged in a cluster of servers or as a server farm, may host the browser application 206 and/or cloud-based software services. Other server architectures may also be used to host the browser application 206 and/or cloud-based software services. The browser application 206 may be capable of handling requests from many users 202 and serving, in response, various user interfaces that can be rendered at the user devices 204 such as, but not limited to, a webpage, a website, network site, or network page. The browser application 206 can interact with any type of website or network site that supports user interaction, including social networking sites, electronic retailers, informational sites, blog sites, search engine sites, news and entertainment sites, and so forth. The described techniques can similarly be implemented outside of the browser application 206, such as with other applications running on the user device 204.

The one or more service provider computers 216 may be any type of computing device such as, but not limited to, a mobile phone, a smart phone, a personal digital assistant (PDA), a laptop computer, a desktop computer, a server computer, electronic book (e-book) reader, a thin-client device, a tablet PC, etc. Additionally, it should be noted that in some embodiments, the one or more service provider computers 216 may be executed by one or more virtual machines implemented in a hosted computing environment. The hosted computing environment may include one or more rapidly provisioned and released computing resources, which computing resources may include computing, networking, and/or storage devices. A hosted computing environment may also be referred to as a cloud computing environment. In some examples, the one or more service provider computers 216 may be in communication with the user device 204 via the networks 212, or via other network connections. The one or more service provider computers 216 may include one or more servers, perhaps arranged in a cluster or as individual servers not associated with one another. The one or more service provider computers 216 may be in communication with one or more third party computers 214, the sorting device 110, the inventory transports 120, or the processing station 130 via networks 212. The one or more service provider computers 216 that host the browser application 206 may obtain and provide data to third party computers 214, the sorting device 110, the inventory transports 120, the management module 140, or the processing station 130 via networks 212 in accordance with embodiments described herein. Additionally, the management module 140 may also correspond to, at least partially include, or be at least partially included within the one or more third party computers 214 and/or the one or more service provider computers 216.

In one illustrative configuration, the one or more service provider computers 216 may include at least one memory 218 and one or more processing units or processors(s) 221. The processor(s) 221 may be implemented as appropriate in hardware, computer-executable instructions, firmware, or combinations thereof. Computer-executable instruction or firmware implementations of the processor(s) 221 may include computer-executable or machine-executable instructions written in any suitable programming language to perform the various functions described. The memory 218 may store program instructions that are loadable and executable on the processor(s) 221, as well as data generated during the execution of these programs. Depending on the configuration and type of the one or more service provider computers 216, the memory 218 may be volatile (such as RAM) and/or non-volatile (such as ROM, flash memory, etc.). The one or more service provider computers 216 or servers may also include additional storage 222, which may include removable storage and/or non-removable storage. The additional storage 222 may include, but is not limited to, magnetic storage, optical disks and/or tape storage. The disk drives and their associated computer-readable media may provide non-volatile storage of computer-readable instructions, data structures, program modules, and other data for the computing devices. In some implementations, the memory 218 may include multiple different types of memory, such as SRAM, DRAM, or ROM.

The memory 218, the additional storage 222, both removable and non-removable, are all examples of non-transitory computer-readable storage media. For example, computer-readable storage media may include volatile or non-volatile, removable or non-removable media implemented in any method or technology for storage of information such as computer-readable instructions, data structures, program modules, or other data. The memory 218 and the additional storage 222 are all examples of computer storage media. Additional types of computer storage media that may be present in the one or more service provider computers 216 may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, or any other medium, which can be used to store the desired information and which can be accessed by the one or more service provider computers 216. Combinations of any of the above should also be included within the scope of computer-readable media.

The one or more service provider computers 216 may also contain communication connection(s) 223 that allow the one or more service provider computers 216 to communicate with a stored database, another computing device or server, user terminals and/or other devices on the networks 212. The one or more service provider computers 216 may also include I/O device(s) 224, such as a keyboard, a mouse, a pen, a voice input device, a touch input device, a display, speakers, a printer, etc.

Turning to the contents of the memory 218 in more detail, the memory 218 may include an operating system 220, one or more data stores 240 and/or one or more application programs, services, or other software modules, which are generally executed by a processor (e.g., the processors 210 and/or 221) for implementing the features disclosed herein.

Example modules are shown in FIG. 2, but functions and embodiments described herein can utilize a subset of the features provided by the modules and/or additional functions can be provided. Additionally, while the example modules will now be briefly discussed with regard to FIG. 2, further specific details regarding the example modules are provided below in the descriptions of subsequent Figures.

As an example module of memory 218, a user identification module 226 can be provided for receiving, sending, updating, and/or otherwise processing information about the users 202, including but not limited to, obtaining an order from a user, locating the items 102 in a warehouse environment, determining a sort location 112 for the items 102 based on the user and/or order data, and determining a processing station 130 for the items. A transport identification module 228 can be provided for handling details associated with associating an inventory transport 120 with an order from users 202 and/or locating the inventory transport 120 in the inventory system 100. A control module 230 can be provided for handling information and/or instructions associated with delivering items from the inventory system 100 to users 202 via the inventory transports 120.

Figure 3:
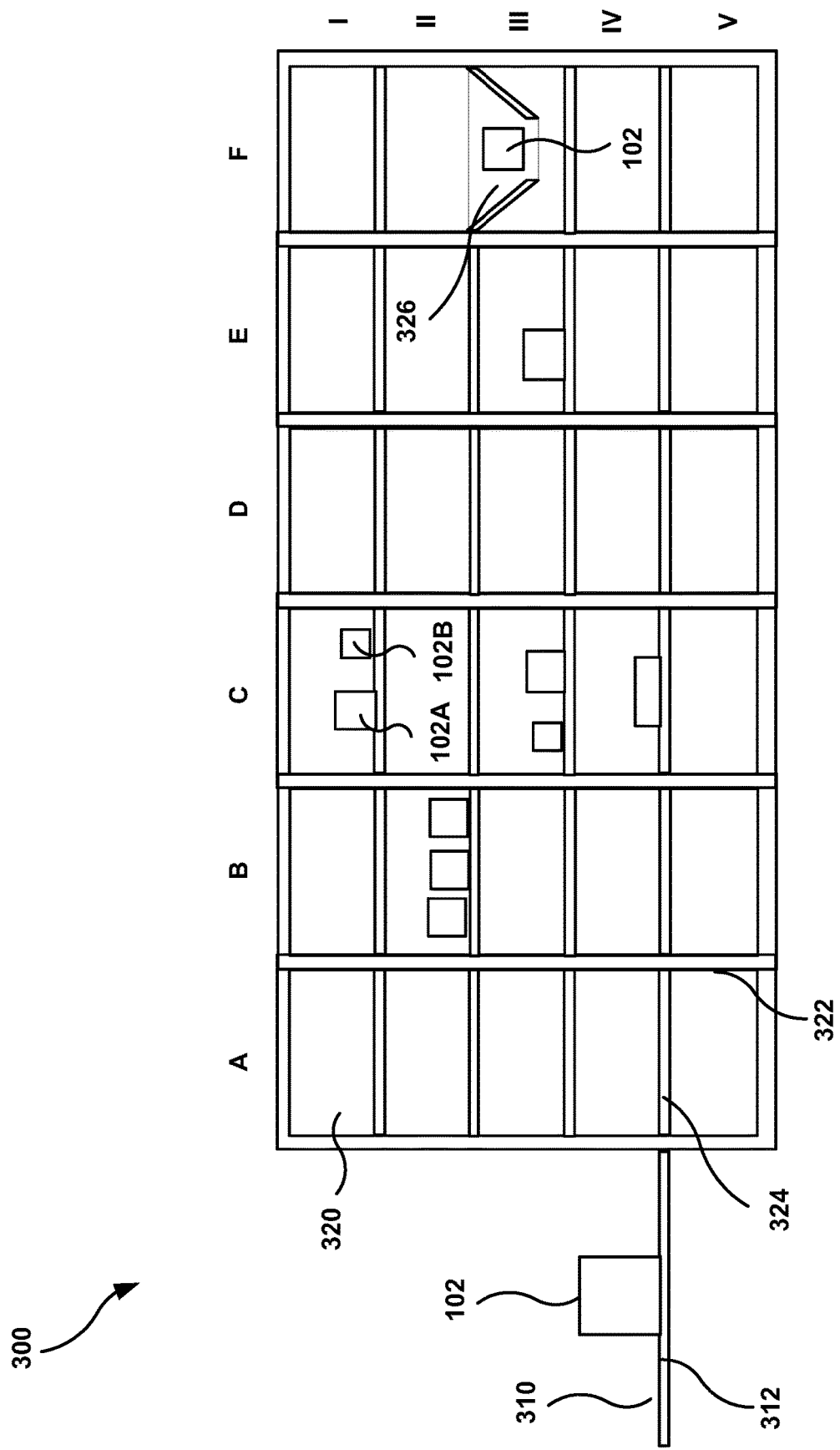
FIG. 3 is a simplified front view of an example sorting device that can be included in particular embodiments of the inventory system of FIG. 1.

Turning now to FIG. 3, an example sorting device 300 is described. The sorting device 300 can be an example of the sorting device 110 described herein. However, the sorting device 300 may contain additional and/or alternative components than those described in reference to the sorting device 110 described in FIG. 1. The sorting device 300 can receive items 102 and transport them to sort locations 112. The sorting device 300 can include input conveyor 310 and sort locations 320. The sorting device 300 can scan items 102 inbound on the input conveyor 310 and sort them to the sort locations 320 to complete customer orders. The items 102 may be inbound from a warehouse environment where the items 102 are stored. In some embodiments, the sorting apparatus can be or is at least similar to the sortation machines and systems described in U.S. Pat. No. 10,278,095, filed Oct. 26, 2017, and entitled Wireless Control of Tightly Spaced Machines, which is incorporated by reference herein in its entirety.

The input conveyor 310 can receive the items 102 inbound from the warehouse environment. The input conveyor 310 can include a conveyor belt 312 that receives the items 102. The input conveyor 310 can be or include components of belted motor driven rollers, motor drive rollers, a conveyor, a robot, a drone, and/or other devices suitable for transporting the items 102.

The sorting device 300 can receive the items 102 for sorting into customer orders. For example, the sorting device 300 can receive the items 102 from the input conveyor 310. However, the sorting device 300 may receive the items 102 directly in an input area. The sorting device 300 can include components for scanning the items 102 as the items enter the sorting device 300. For example, the sorting device 300 can include a scanner, for example an optical scanner. The sorting device 300 can communicate with the control module 140 to send the item data to the control module. The item data can include the size of the item 102, the weight of the item, or an item priority. However, the item data can include additional and/or alternative item information.

The sorting device 300 can transport the items 102 to one or more sort locations 320. The sort locations 320 can be an example of the sort locations 112. However, the sort locations 320 may contain additional and/or alternative components than those described in reference to the sort locations 112 described in FIG. 1. The sort location 320 can correspond to a customer order. For example, the management module 140 can designate a sort location 320 for each customer order received. Items 102 can be transported to the sort location 320 based on the customer order. In some embodiments, the sorting device 300 and control module 140 are in communicate to designate the sort locations 320. The sort locations 320 can be automatically assigned by the control module 140 based on order data associated with the customer order. However, the sort locations 320 may be manually assigned by a user.

The sort locations 320 can be defined by vertical partitions 322 and horizontal partitions 324. The partitions can be spaced apart to define the sort locations 320. The sort locations 320 can have dimensions larger than those that may be used in traditional sorting devices to avoid jammed items 102. The sort locations 320 can be similar in size and shape to the cubbies 122. The sort locations 320 can be arranged in a pattern. For example, the sort locations 320 can be arranged in columns, with each column containing one or more rows. As shown, the sorting device 300 includes columns A through F and rows I through V.

As an illustrative example, the sorting device 300 can receive a first item 102A associated with a customer order. The sorting device 300 can send item data to the control module 140 and receive a sort location 320 for the item 102A. For example, the sort location 320 can be col. C, row I. The sorting device 300 can transport the item 102A to the designated sort location 320 (col. C, row I). The sorting device can receive a second item 102B associated with the same customer order and receive the same sort location 320 (col. C, row I). The sorting device 300 can transport the second item 102B to the sort location 320 (col. C, row I).

In some embodiments, the sorting device 300 can transport items 102 associated with the same customer to different sort locations 320. For example, one item 102 from the customer order may be transported to a first sort location 320 and a second item may be transported to a second sort location. The items 102 may be sent to separate sort locations 320 based on item data and/or or order data. For example, an order may be given priority and the items 102 may be sent to the first available sort location for faster processing.

In some embodiments, the sorting device 300 can include one or more item transfer chutes 326 attached to one or more sort locations 320. The item transfer chutes 326 can aid in transferring the items 102 from the sort locations 320 to the inventory transports 120. For example, when an item 102 reaches the sort location 320 the item can exit the sort location via the item transfer chutes 326. The transfer chutes 326 can include a bottom surface and sidewalls allowing the item transfer chutes 326 to guide the items 102 when the items are transferred from the sorting locations 320 directly to cubbies 122 in the inventory transports 120. For example, the item transfer chutes 326 can center the items 102 in the cubbies 122 of the inventory transports 120. The transfer chutes 326 can be or included a slide or similar components for transferring the items 102 without needing further input. However, the transfer chutes 326 may be or include automated components for transferring of the items 102 with a robotic arm or similar robotic components.

Figure 4:
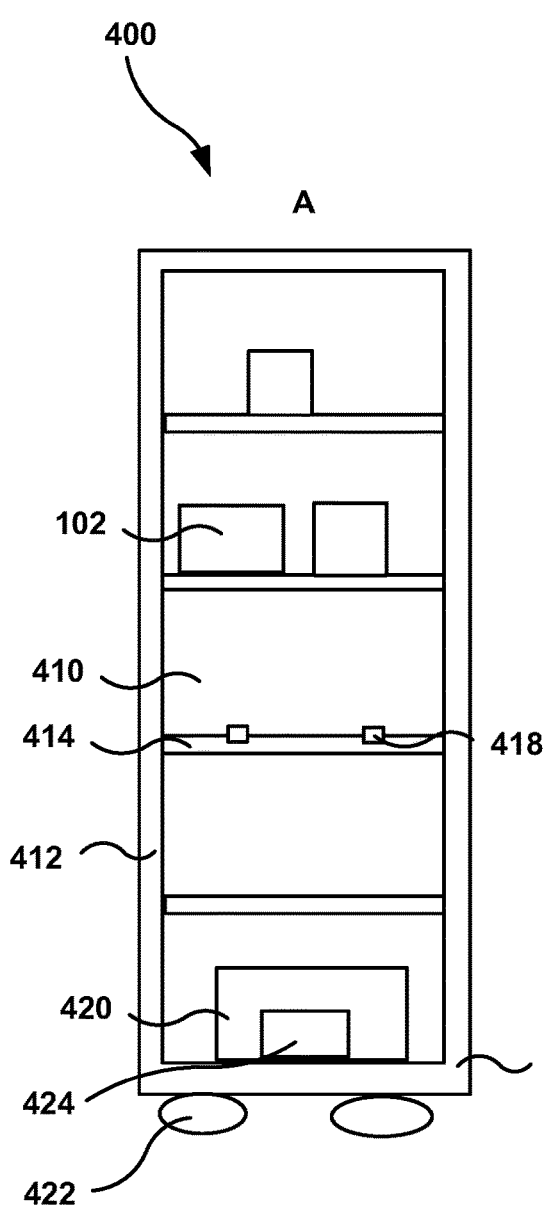
FIGS. 4 and 5 are simplified front views of inventory transporters that can be included in particular embodiments of the inventory system of FIG. 1.
Figure 5:
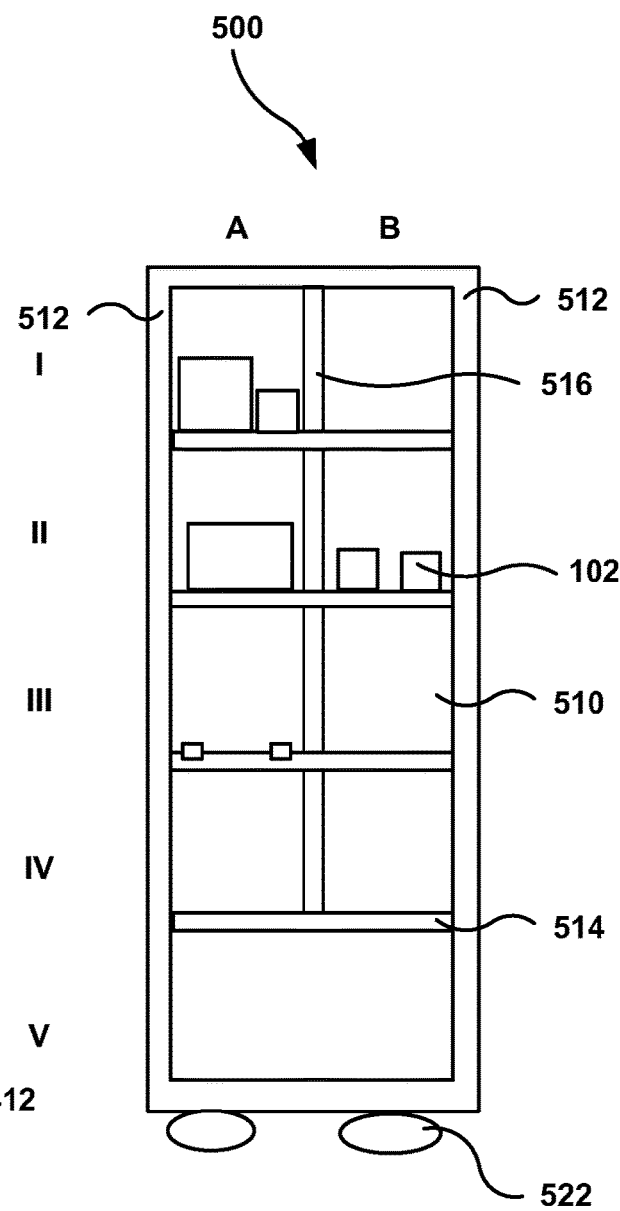

The inventory transports 120 can receive the items 102 from the sort locations 320. FIGS. 4 and 5 illustrate two example inventory transports 400 and 500, respectively, that can be used with the inventory system 100 of FIG. 1. The inventory transports 400 and 500 can be examples of the inventory transport 120 described herein. For example, items slots 410 and 510 can be examples of cubbies 122. However, the inventory transports 400 and 500 may contain additional and/or alternative components than those described in reference to the inventory transport 120, as described in FIG. 1. For example, item slots 410 or 510 may be an example of multiple cubbies 122. The inventory transports 400 and 500 can include the same or similar components. For example, a discussion of inventory transport 400 can be applicable to inventory transport 500 and vice versa. However, the inventory transports 400 and 500 may have different components or different designs. The inventory transports 400 and 500 can be at least similar to the inventory holders described in U.S. Pat. No. 9,580,245, filed Jun. 10, 2014, and entitled Item-Detecting Overhead Sensor for Inventory System, which is incorporated by reference herein in its entirety.

In FIGS. 4 and 5 only one side of the inventory transports 400 and 500 are shown. However, the inventory transports 400 and 500 can include multiple sides for receiving items 102. In some embodiments, the sides of the transports 400 and 500 can have different numbers of item slots 410 and 510 respectively. For example, FIG. 4 may represent a first side and FIG. 5 may represent an opposing side. Alternatively, the inventory transports 400 and 500 can have the same number of slots, 410 and 510 respectively, on more than one side.

In various embodiments, inventory transports 400 and 500 can be customized to engage with the sorting device 110. For example, the inventory transports 400 and 500 can include item slots 410 and 510 respectively that can be aligned with the sort locations 112 of the sorting device 110. The item slots 410 and 510 can receive the items 102 as the items reach the sort locations 112. Item slot 410 can be defined by opposing sidewalls 412 that are laterally spaced apart from one another to define an opening. Partitions 414 can span between sidewalls 412 and be vertically spaced apart from one another to define the item slot 410. The item slot 410 can correspond to the size and shape of the sort location 112. However, the item slot 410 may have dimension that are larger than a single sort location 112. In some embodiments, the a vertical partition 516 can be included for separating the items slots 510 into two columns. For example, inventory transport 500 has column A and column B separated by vertical partition 516. Each column A or B can have similar dimensions to column A of inventory transport 400. However, columns A or B can have smaller dimensions than column A of inventory transport 400, such that, the combined width of columns A and B are similar to the width of column A of inventory transport 400.

In various embodiments, the items slots 410 can be arranged in a pattern. The pattern can correspond to the pattern of the sort locations 112. As an illustrative example, the inventory transport 410 has a single column, column A, of item slots 410 split into rows I through V. The width of column A can correspond to the width of column A shown in FIG. 3. However, the width of column A may correspond to the combined with of multiple columns shown in FIG. 3, for example, the combined width of columns A and B of the sorting device 300.

In further embodiments, the height of the rows I through V of inventory transport 400 can be similar to the height of the rows I through V of the sorting device 300. Additionally or alternatively, each of the rows of the inventory transport 400 can be aligned with the rows of the sorting device 300, such that, when the inventory transport is positioned adjacent to the sorting device the rows will be aligned. However, the rows of the inventory transport 400 may be offset from the rows of the sorting device 300. For example, the rows of the inventory transport may be positioned at a lower height than the corresponding row of the sorting device 300 to allow items to be transferred from the sorting device to the inventory transport.

In some embodiments, the items slots 510 can be arranged to have multiple columns of item slots 510 in a single inventory transport 500. The multiple columns can be created with a physical barrier, for example, vertical partition 516. However, the multiple columns may be created with a digitally created barrier. The width of the columns of inventory transport 500 can correspond to the width of the columns of sorting device 300. However, the width of the columns of inventory transport 500 may vary with the width of the columns of sorting device 300. For example, the combined width of columns A and B of the inventory transport 500 can correspond to the width of column A of the sorting device 300. Additionally or alternatively, the width of column A of the inventory transport 500 can correspond to the combined width of columns A and B of the sorting device 300 and the width of column B of the inventory transport can correspond to the width of columns C and D of the sorting device.

In further embodiments, the inventory transports 400 and 500 can include one or more engagement components for engaging with the sorting device 110. For example, inventory transport 400 can include engagement devices 418 for engaging with the item ramp 326. The engagement components can be or include a latch, a notch, a male or female connector, or a treated surface.

The inventory transports 400 and 500 can include a propulsion system 420. The propulsion system 420 can be used to move inventory transport 400 around the inventory system 100, for example, between the sorting device 110 and the processing station 130. The propulsion system 420, as depicted, includes wheels 422 and a motor 424 to move the inventory transport 400, however, the propulsion system 420 could also include any elements capable of moving the inventory transport 400. For example, the propulsion system 420 may include propellers, tracks, treads, a jet engine, skis, a fan, or any additional or alternative components that may allow the propulsion system to travel across any matter of terrain.

In various embodiments, the propulsion system 420 can be or include the drive units described in U.S. Pat. No. 9,580,245, filed Jun. 10, 2014, and entitled Item-Detecting Overhead Sensor for Inventory System, which is incorporated by reference herein in its entirety. The propulsion system can move the inventory transport 400 between locations within the inventory system 100. The propulsion system 420 may represent any devices or components appropriate for use in inventory system 100 based on the characteristics and configuration of inventory transport 400 and/or other elements of inventory system 100. In a particular embodiment of the inventory system 100, the propulsion system 420 can represent independent, self-powered devices configured to freely move about the inventory system 100. In alternative embodiments, the propulsion system 420 represents elements of a tracked inventory system configured to move the inventory transport 400 along tracks, rails, cables, crane system, or other guidance or support elements traversing the inventory system 100. In such an embodiment, the propulsion system 420 may receive power and/or support through a connection to the guidance elements, such as a powered rail. Additionally, in particular embodiments of the inventory system 100 the propulsion system 420 may be configured to utilize alternative conveyance equipment to move within the inventory system 100 and/or between separate portions of the inventory system.

In further embodiments, the propulsion system 420 can communicate with the control module 140 to receive a route the inventory transport 400 should follow. This route can include a position where the inventory transport 400 is aligned with a location on the sorting device 110. The propulsion system 420 can align the inventory transport 400 with the location on the sorting device 110 to receive an item 102. Additionally or alternatively, the propulsion system can rotate the inventory transport 400 to align a different face of the inventory transport with the sorting device 110.

In some embodiments, the inventory transport 500 can be moved around the inventory system 100 using external propulsion. The inventory transport 500 can include components to aid in movement around the inventory system 100. For example the inventory transport 500 includes wheels 522 to aid in movement. The external propulsion source can be or include a cart, a robot, or a drone. The external propulsion source can engage with the inventory transport 500 to move the inventory transport. For example, the external propulsion source can include attachments for attaching to the inventory transport 500.

In many embodiments, the inventory transport 400 or 500 can be sized to interface with the sorting device 110 and having a storage area for items 102. For example, one or more of the item slots 410 can be used for storage of items 102.

Figure 6:
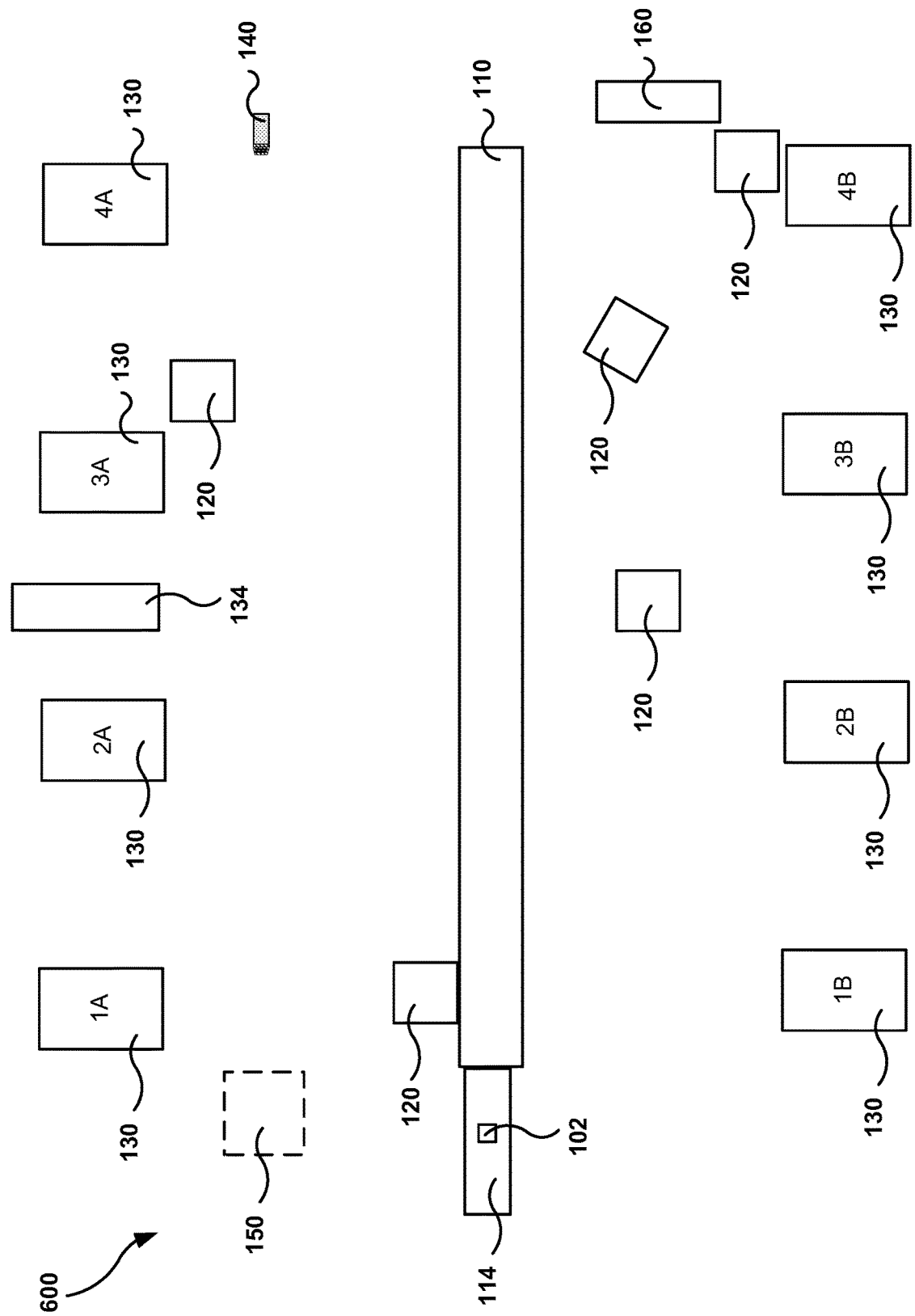
FIG. 6 is a simplified top view of an example layout of an inventory system for use with the components of FIGS. 1 through 7 according to a particular embodiment.

Turning to FIG. 6, a top view of an example inventory system 600 is shown. The inventory system 600 can be used with any and/or all of the components described herein. An item 102 can be received on an input conveyor 114 for delivery to a sorting device 110. A single sorting device 110 is shown, however, multiple sorting devices 110 can be used with the inventory system 600 and can be fed by one or more input conveyors 114. The sorting device 110 can receive the item 102 and scan the item for item data. The sorting device 110 can send the item data to a control module 140 and receive a sort location for the item 102. The sort location can be based on order data associated with the item and/or the item data and correspond to a customer order. The sorting device 110 can transport the item 102 to the sort location. The item 102 can be stored at the sort location or transferred to the inventory transport 120. The inventory transport 120 can be positioned adjacent to the storing device 110 to receive the item 102 in an cubby 122. Each cubby 122 can correspond to a customer order. In various embodiments, positioning the inventory transport 120 can include rotating the inventory transport to position a different side of the inventory transport adjacent to the sorting device 110. The inventory transport 120 can continue to receive items 102 until one or more cubbies 122 are filled.

The inventory transport 120 can transport the items 102 to one or more packing stations 130. For example, the inventory transport 120 can transport the items 102 to packing station 3A, then to packing station 4A, and finally return to the sorting device 110. The inventory transport 120 may transport the items 102 to an output conveyor 134. The output conveyor 134 can transport the items 102 to a processing station 130. However, the output conveyor 134 may convey the items 102 for further processing.

In various embodiments, the inventory transports 120 can move to a designated waiting area 150 and/or additional storage area 160. The designated waiting area 150 can be a position in the inventory system 600 where the inventory transports 120 can wait for items 102 to be added and/or removed. For example, if a rush order is received, a first inventory transport 120 can receive a first portion of the order and a second inventory transport 120 can receive a second portion of the order. The first inventory transport 120 can wait in the designated waiting area until the second portion has been received by the second inventory transport 120 and the first and second inventory transports can move the items to the same processing station 130. The additional storage area 160 can be a location in the inventory system 600 where items 102 are added and/or removed from the inventory transports 120. For example, the additional storage area 160 can hold oddly shaped or overweight items. The inventory transports 120 can receive most of the items 102 for a customer order from the sorting device 110 and transport the items to the additional storage area 160 to receive the remaining items. In some embodiments, the additional storage area includes additional components for transferring items to the inventory transports 120.

In many embodiments, the designated waiting area 150 can be or include an additional sorting machine for interfacing with the inventory transport 120. For example, the designated waiting area 150 can include a sorting machine for sorting items 102 that can be deposited into the inventory transport 120.

Items 102 can be received at the packing stations 130 for further processing. The packing stations 130 can be in communication with the control module 140 to receive packing and/or shipping instructions. The packing stations 130 can include components for transferring the items 102 from the inventory transports 120 to the packing stations. For example, the packing stations 130 may include robotic arms for transferring items 102. However, the items may be transferred to the processing station 130 manually. In many embodiments, automatic components may be used in addition with manual transferring of items 102.

Figure 7:
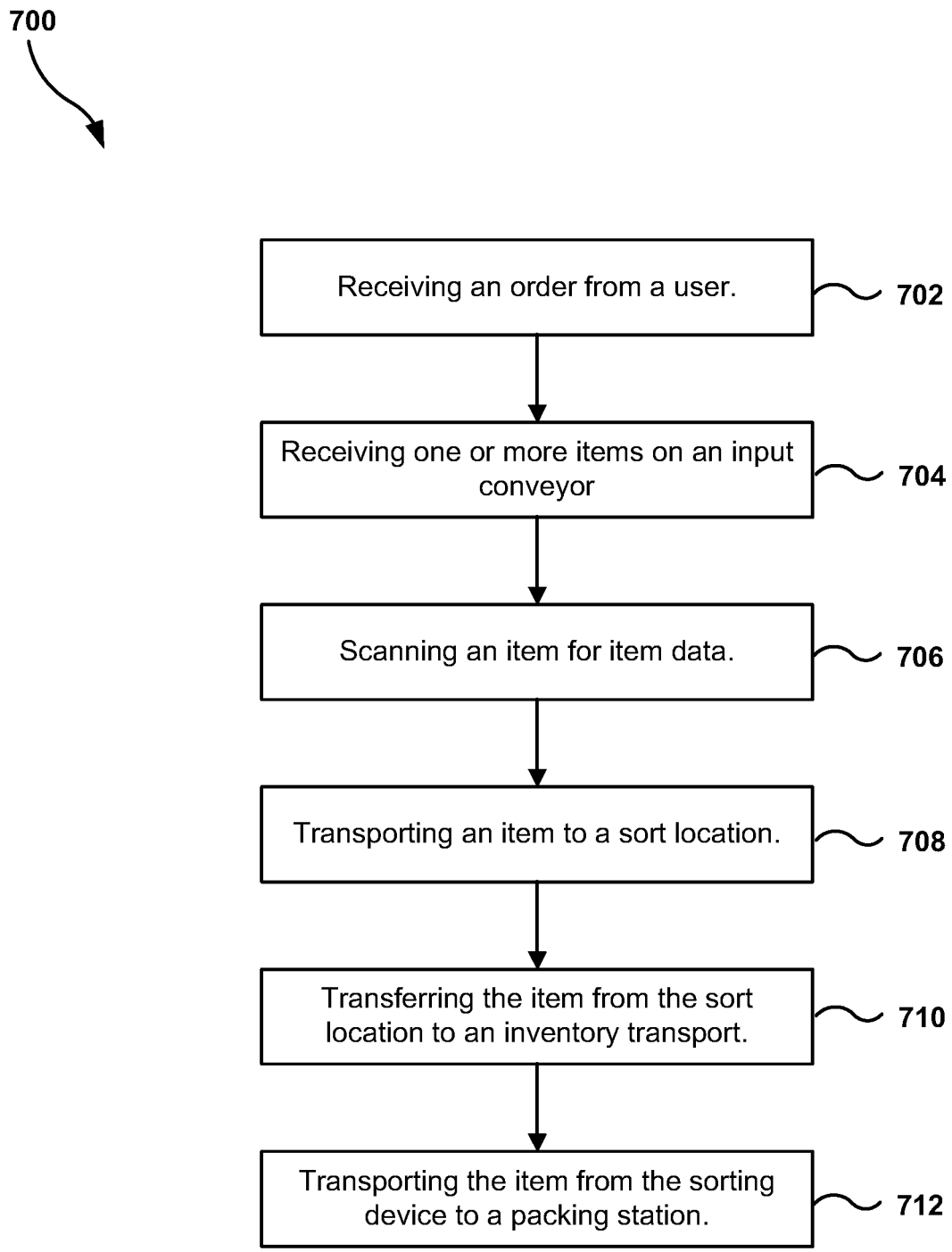
FIG. 7 is a flowchart illustrating a process for transporting inventory for use with the inventory system of FIG. 1 according to particular embodiments.

Turning to FIG. 7 a flowchart illustrating a process 700 for transporting inventory for use with the inventory system 100 of FIG. 1 is described. Some or all of the process 700 (or any other processes described herein, or variations, and/or combinations thereof) may be performed under the control of one or more computer system configured with executable instructions and may be implements as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. Moreover, unless indicated otherwise, acts shown in the processes are not necessary performed in the order shown, and/or some acts can be omitted in embodiments.

The process 700 at 702 can include receiving an order from a user 202. The user 202 may place their order using the user devices 204. The order may include particular items to be provided from a warehouse environment. The order may be received by the service provider computers 216, for example, by the user identification module 226. The order data can include the customer's name, address, order priority, order date, or shipping date.

The process 700 at 704 can include receiving one or more items 102 on an input conveyor 114. The input conveyor 114 can transport the items 102 from a warehouse environment to the sorting device 110. In various embodiments, the items 102 can be contained in a bin 104 before being placed on the input conveyor. However, the items 102 may be placed directly on the input conveyor.

The process 700 at 706 can include scanning an item 102 for item data. The item data can include the size, weight, shape, priority, or expiration date of the item. The item data can be sent to the control module 140 and associated with a customer order. Additionally or alternatively the item data can be used to determine a sort location for the item 102.

The process 700 at 708 can include the sorting device 110 transporting an item 102 to a sort location 112. The sorting device 110 may be used to sort items 102 and place the items into sort locations 112. The sort location 112 can be determined based on order data and/or item data. The sorting device 110 can transport the items 102 using mechanical components, for example, elevators. The sort locations 112 can be arranged in a pattern to correspond to a pattern of the inventory transports 120. For example, the sort locations 112 can be arranged in columns and rows.

The process 700 at 710 can include transferring the items 102 from the sort locations 112 to the inventory transports 120. The items 102 can be transferred to the inventory transports 120 upon arrival at the sort locations. However, the items 102 may be temporarily stored at the sort locations 112 before transferring the items to the inventory transports. The inventory transports 120 can receive the items 102 in one or more cubbies 122. The cubbies 122 can be sized and shaped to receive one or more items 102. In some embodiments, the items 102 are transferred from the sort locations 112 to the cubbies 122 using a transfer chute sized and shaped to guide the items into the item slots.

The process 700 at 712 can include transporting the items 102 in the inventory transports 120 from the sorting device 110 to one or more packing stations 130. The items 102 can be transferred using a propulsion system contained in the inventory transport 120 or can be an external propulsion system. The inventory transports 120 can transport the items 102 along a route received from the control module 140. For example, the inventory transport 120 can transport the items 102 to a first processing station 130 for removal of a portion of the items and transport the remaining items to a second packing station for removal of the remainder of items.

In some embodiments, transporting the items 102 can include repositioning the inventory transports 120 to receive additional items 102 from the sorting device. For example, the inventory transports 120 can rotate to position a side of different cubbies 122 for receiving items.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A system comprising,
    a sorting machine operable to identify and deliver items based on order data associated with the items, the order data including customer orders with each of the customer orders containing one or more items, wherein the sorting machine comprises sort locations for receiving the items and transferring the items from the sort locations;
    an inventory transport comprising:
        cubbies arranged in vertical columns and horizontal rows on a first side of the inventory transport, a first cubby of the cubbies configured to receive a first item associated with a first customer order from a first sort location and a second cubby of the cubbies configured to receive a second item associated with a second customer order from a second sort location when the cubbies are aligned with the sort locations; and
        a propulsion system selectively operable to align the first and second cubbies with the respective first and second sort locations;
    a packing station for receiving the first and second items from the respective first and second cubbies, the propulsion system selectively operable to position the first side of the inventory transport adjacent to the packing station for transferring of the first and second items from the first and second cubbies to the packing station for packing of the first and second items; and
    a module operable to:
        instruct the sorting machine to identify and deliver the first item of the first customer order to the first sort location and the second item of the second customer order to the second sort location;
        operate the propulsion system to align the inventory transport so that the first cubby is aligned with the first sort location and receives the first item from the first sort location and the second cubby is aligned with the second sort location and receives the second item from the second sort location; and
        operate the propulsion system to transport the first item to the packing station.

2. The system of claim 1, wherein, prior to operating the propulsion system to transport the first item to the packing station, the module is operable to:
    instruct the sorting machine to identify and deliver a third item from the first customer order to the first sort location;
    operate the propulsion system to align the first cubby with the first sort location to receive the third item from the first sort location; and
    operate the propulsion system to transport the first, second, and third items to the packing station.

3. The system of claim 1, wherein, prior to operating the propulsion system to transport the first item to the packing station, the module is further operable to:
    instruct the sorting machine to identify and deliver a third item from the first customer order to a third sort location;
    operate the propulsion system to align the first cubby with the third sort location to receive the third item from the third sort location; and
    operate the propulsion system to transport the first, second, and third items to the packing station.

4. The system of claim 1, wherein, prior to operating the propulsion system to transport the first item to the packing station, the module is further operable to:
    instruct the sorting machine to identify and deliver a third item from the first customer order to a third sort location and identify and deliver a fourth item from the second customer order to a fourth sort location;
    operate the propulsion system to align the inventory transport so that the first and second cubbies are aligned with the respective third and fourth sort locations to receive the third and fourth items; and
    operate the propulsion system to transport the first, second, third, and fourth items to the packing station.

5. The system of claim 1, wherein the sorting machine further comprises a chute coupled with the first sort location, the chute sized and shaped for aligning with the first cubby of the inventory transport and transferring the first item from the first sort location to the first cubby.

* * * * *